(12) United States Patent
Uuzzie et al.

(10) Patent No.: US 7,753,020 B2
(45) Date of Patent: Jul. 13, 2010

(54) GEARWHEEL MECHANISM

(75) Inventors: Thomas Uuzzie, Rochester Hills, MI (US); Harald Gieb, Weinstadt (DE); Lawrence Kennedy, Bingham Farms, MI (US)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/974,171

(22) Filed: Oct. 11, 2007

(65) Prior Publication Data

US 2009/0095263 A1      Apr. 16, 2009

(51) Int. Cl.
   *F01L 1/02*          (2006.01)
(52) U.S. Cl. .................... 123/90.31; 123/508; 123/509; 29/464; 29/893; 74/413; 74/414
(58) Field of Classification Search ............... 123/235, 123/90.27, 193.5, 198 F, 90.31, 508, 509; 418/249, 91; 74/640, 475, 413, 414, 421 R, 74/421 A; 29/893.1, 464–468
See application file for complete search history.

(56) References Cited

U.S. PATENT DOCUMENTS 3,995,601 A * 12/1976 Schwartz .................... 123/235
6,953,015 B2 * 10/2005 Asari et al. ............... 123/90.27
2008/0202289 A1 * 8/2008 Sakamoto et al. ............. 75/570

FOREIGN PATENT DOCUMENTS

DE       10 2007 016 019      9/2008
FR            2 806 174        9/2001
JP             06 257470       9/2004

* cited by examiner

*Primary Examiner*—Stephen K Cronin
*Assistant Examiner*—Keith Coleman
(74) *Attorney, Agent, or Firm*—Klaus J. Bach

(57) ABSTRACT

In a gearwheel mechanism for driving a secondary unit such as a fuel pump driven via the gear wheel mechanism by a primary unit, a driven gear mounted on the secondary unit is provided with a positioning element including sections covering teeth areas of the driven gear so that those sections cannot be engaged with a driving gear of the primary unit during mounting of the secondary unit, and in a pump having a gear provided with such a positioning element as wells as an internal combustion engine including a pump with a gear provided with a positioning element.

6 Claims, 1 Drawing Sheet

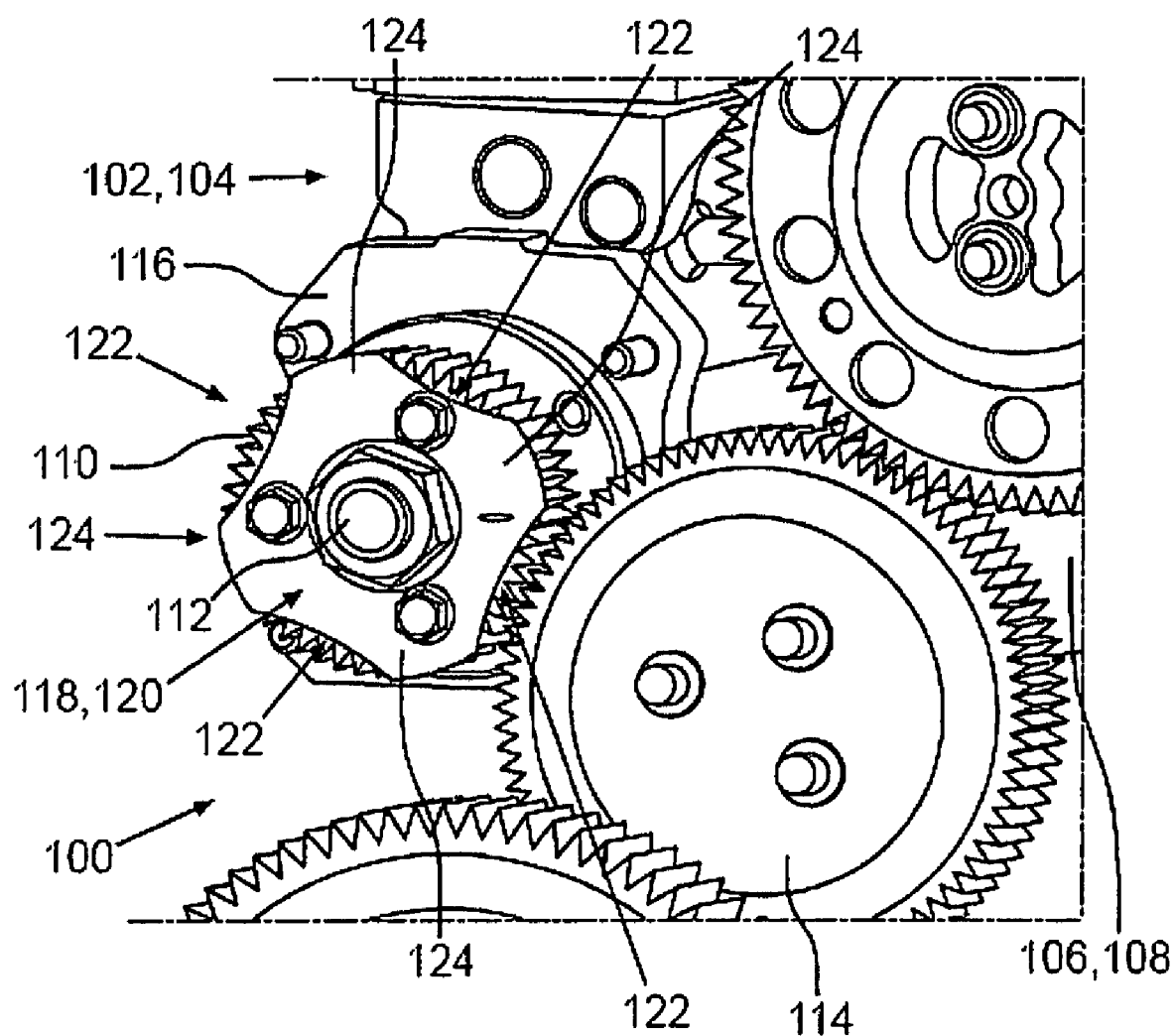

GEARWHEEL MECHANISM

BACKGROUND OF THE INVENTION

The invention relates to a gearwheel mechanism disposed between a primary unit and a secondary unit to be driven by the primary unit via the gear wheel mechanism, for example a high-pressure pump mounted to an internal combustion engine and driven thereby via such a gearwheel mechanism.

In practice, secondary units are often driven by a primary unit via a gearwheel mechanism. Primary units are, for example, internal combustion engines which drive a high-pressure fuel pump via a gearwheel mechanism, the high-pressure fuel pump being a secondary unit within the meaning of the invention.

Primary units and secondary units often operate in a pulsating manner, particularly when they are devices consisting of one or more piston/cylinder units. It is therefore necessary, for example, for a high-pressure fuel pump to run synchronously with an internal combustion engine, in order to make fuel available corresponding to the pulsating consumption of the internal combustion engine. The corresponding mounting of the high-pressure fuel pump (secondary unit) with respect to the internal combustion engine (primary unit) is also designated as clocking. If the clocking of the high-pressure fuel pump with respect to the internal combustion engine is not correctly set, efficiency losses will occur. In order to avoid such efficiency losses, the mounting of high-pressure fuel pumps on internal combustion engines must be carried out with great care, so that the assembly is correspondingly complicated.

It is the object of the present invention to facilitate the mounting of secondary units to primary units.

SUMMARY OF THE INVENTION

In a gearwheel mechanism for driving a secondary unit such as a fuel pump driven via the gear wheel mechanism by a primary unit, a driven gear mounted on the secondary unit is provided with a positioning element including sections covering teeth areas of the driven gear so that those sections cannot be engaged with a driving gear of the primary unit during mounting of the secondary unit. The invention also resides in a pump having a gear provided with such a positioning element as wells as an internal combustion engine including a pump with a gear provided with a positioning element.

The positioning element makes it possible to mount a driving gearwheel in relation to a driven gearwheel in certain angular orientations only. The positioning element thus prevents the driven gearwheel, which is mounted on the secondary unit, from being coupled with a false rotary-angle orientation to the driving gearwheel which is associated with the primary unit. During the mounting of the secondary unit on the primary unit, it is therefore no longer necessary to check the orientation of the driven gearwheel, that is to say the angular position of the gear of the secondary unit, thus making mounting considerably easier and also reliably preventing false mounting.

According to a preferred embodiment of the invention, the positioning element has at least one covering sector which permits engagement of the teeth of the driven gearwheel and of the driving gearwheel only in predetermined relative angular positions. If the teeth of one gearwheel cannot be engaged with the other in a particular position, it is not possible, to install the secondary unit that is the secondary gear can not be installed in an incorrect position.

According to a refinement of the invention, the positioning element is a flat positioning disc which is arranged or formed on the end face of the driven gearwheel. A flat positioning disc has the advantage that it requires little construction space and also only insignificantly increases the weight of the gearwheel mechanism.

If, as provided according to a further preferred embodiment, the positioning element is connected permanently to the driven gearwheel, the advantages achieved by means of the invention are attained not only during the original assembly, but also a separation of the secondary and the primary unit should become necessary during maintenance or repair work.

While a flat positioning disc is suitable as a positioning element particularly for mounting by means of an assembly operation in the axial direction of the driven gearwheel, a positioning element designed as a sleeve extending over the driven gearwheel is suitable particularly for mounting with an assembly direction transverse to the axis of the gearwheel.

If the positioning element is designed as a sleeve covering the driven gearwheel, it is advantageous for the former to be arranged releasably on the driven gearwheel, so that it can be removed after the gearwheel is mounted. Basically, however, it is also possible within the scope of the invention to arrange a positioning element in the form of a sleeve so as to be displaceable in the axial direction of the driven gearwheel, with the result that such a positioning element can then remain on the driven gearwheel of the secondary unit.

The advantages of the invention are apparent particularly when the gearwheel mechanism is used for driving the fuel pump in an internal combustion engine. Protection is therefore also sought for an internal combustion engine and for a high-pressure pump.

The invention will be more readily apparent from the following description of a preferred embodiment thereof described below in conjunction with the accompanying drawing:

BRIEF DESCRIPTION OF THE DRAWING

The sole FIGURE shows a preferred embodiment of a gearwheel mechanism according to the invention for driving a high-pressure fuel pump in a perspective illustration.

DESCRIPTION OF A PREFERRED

The gearwheel mechanism 100 shown in the FIGURE serves for driving a high-pressure fuel pump 104, provided as a secondary unit 102, of an internal combustion engine 106, the piston/cylinder units of the internal combustion engine 106, which are combined in an engine block (not shown), forming a primary unit 108.

The gearwheel mechanism 100 comprises a driven gearwheel 110, which is connected fixedly in terms of rotation to a shaft 112 of the high-pressure fuel pump 104, and also a driving gearwheel 114, which at the same time is an intermediate wheel of a gear transmission provided on an engine block (not shown) of the internal combustion engine 106. The driven gearwheel 110 is fixed in terms of rotation to the shaft 112 of the high-pressure fuel pump by means of a tongue-and-groove engagement structure.

The high-pressure fuel pump 104 has two piston/cylinder units in a known way. The working position of the piston/cylinder units cannot be recognized from outside of the casing 116 of the high-pressure fuel pump 104. In the high-pressure fuel pump 104 according to the invention as shown in FIG. 1, however, the driven gearwheel 110 has provided on it as a positioning element 118 a flat positioning disc 120 which makes it possible to detect the working position of the pistons of the piston/cylinder units.

The flat positioning disc 120 has substantially a diameter which is larger than the root diameter of the driven gearwheel 110, although four crescent-shaped cutouts 122 are provided for mounting purposes. These crescent-shaped cutouts 122 are matched with four covering sectors 124 which reliably prevent incorrect mounting to the driving gearwheel 114 by means of an assembly operation in the axial direction of the driven gearwheel 110, since, on account of the positioning disc 120, the teeth of the secondary gear wheel can engage the teeth of the primary gear wheel only in discrete rotary-angle orientations.

The positioning disc 120 is disposed flat on the driven gearwheel 110 and screwed to the latter, three threaded screws being provided at a respective angular interval of 120°.

When the high-pressure fuel pump 104 described above is to be mounted, the piston of the cylinder 1 of the internal combustion engine is set to the top or bottom dead center position. The high-pressure fuel pump 104 provided with the positioning disc 120 is then inserted through an opening in the transmission housing and brought into engagement with the driving gearwheel 114.

Since the covering sectors of the positioning disc 120 cover part of the teeth of the driven wheel 110, the covered teeth cannot be brought into engagement with the driving gearwheel 114.

The high-pressure fuel pump 104 shown is a two-cylinder pump, so that four angular orientations for mounting the high-pressure fuel pump 104 are available, corresponding to the four cutouts 122 and the four covering sectors 124.

What is claimed is:

1. A gearwheel mechanism of an internal combustion engine for driving a secondary unit (102) running synchronously with a primary unit (108), with a driving gearwheel (114) mounted to the primary unit and with a driven gearwheel (110) mounted on the secondary unit (102), there being provided and mounted only on the driving gearwheel as a mounting aid a positioning element (118) comprising a flat positioning disc (120) which is mounted onto the end face of the driven gearwheel (110) and has at least one covering sector (124) covering the teeth of a section of the driven gear wheel (110) which makes mounting of the gearwheels possible only in certain preferred rotary-angle orientations of the driven gearwheel (110) in relation to the driving gearwheel (114).

2. A gearwheel mechanism according to claim 1, wherein the positioning element (118) is connected permanently to the driven gearwheel (110).

3. A gearwheel mechanism according to claim 1, wherein the positioning element is a sleeve partially covering the driven gearwheel.

4. A gearwheel mechanism according to claim 3, wherein the positioning element is releasably mounted onto the driven gearwheel (110).

5. An internal combustion engine, with a spur-wheel transmission and with a fuel pump, the fuel pump being connected to the spur-wheel transmission via a gearwheel mechanism (100) including a driven gear wheel (114) operated by ~he internal combustion engine and a driven gear wheel (ii0) connected to the fuel pump, the driven gear wheel being provided and mounted only on the driving gearwheel with a positioning element (118) comprising a flat positioning disc (120) which is mounted onto the end face of the driven gearwheel (110) and having has at least one covering section (124) covering a gear section of the driven gearwheel (110) to permit installation of the covered gear section in relation to the driving gear wheel (114) only in certain relative rotary angle orientations.

6. An internal combustion engine according to claim 5, wherein the positioning element (118) is connected permanently to the driven gearwheel (110).

* * * * *